United States Patent
Tatsubori

(10) Patent No.: US 9,571,447 B2
(45) Date of Patent: Feb. 14, 2017

(54) SYSTEM AND METHOD FOR ACCESSING INFORMATION

(71) Applicant: International Business Machines Corporation, Armonk, NY (US)

(72) Inventor: Michiaki Tatsubori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 14/155,696

(22) Filed: Jan. 15, 2014

(65) Prior Publication Data
US 2014/0207970 A1    Jul. 24, 2014

(30) Foreign Application Priority Data
Jan. 21, 2013    (JP) .................................. 2013-007970

(51) Int. Cl.
| | |
|---|---|
| G06F 15/16 | (2006.01) |
| H04L 29/12 | (2006.01) |
| G06F 9/45 | (2006.01) |
| G06F 21/62 | (2013.01) |
| G06F 17/30 | (2006.01) |
| G06F 9/44 | (2006.01) |

(52) U.S. Cl.
CPC ............. *H04L 61/1511* (2013.01); *G06F 8/30* (2013.01); *G06F 8/43* (2013.01); *G06F 17/3089* (2013.01); *G06F 17/30879* (2013.01); *G06F 21/6209* (2013.01)

(58) Field of Classification Search
CPC ................... G06F 17/30899; H04L 29/08099; H04L 67/141; H04L 67/10; H04L 67/42
See application file for complete search history.

(56) References Cited

U.S. PATENT DOCUMENTS

| | | | | |
|---|---|---|---|---|
| 8,478,881 | B2 * | 7/2013 | Berry ................... | H04L 67/14 709/217 |
| 2002/0099829 | A1 * | 7/2002 | Richards ........... | G06F 17/30899 709/227 |
| 2013/0159395 | A1 * | 6/2013 | Backholm ......... | H04L 29/08099 709/203 |
| 2014/0033067 | A1 * | 1/2014 | Pittenger ............... | G06F 21/606 715/751 |
| 2015/0373125 | A1 * | 12/2015 | Montemurro ......... | H04L 67/141 709/228 |

FOREIGN PATENT DOCUMENTS

| | | |
|---|---|---|
| JP | 2000049867 A | 2/2000 |
| JP | 2002183596 A | 6/2002 |
| JP | 2003186764 A | 7/2003 |
| JP | 2014139708 A | 7/2014 |

* cited by examiner

*Primary Examiner* — Chirag R Patel
*Assistant Examiner* — Rachel J. Hackenberg
(74) *Attorney, Agent, or Firm* — Reza Sarbakhsh

(57) ABSTRACT

A mobile terminal accesses global DNS server using a URI of a resource in an intranet. The global DNS server returns an IP address of an intranet domain access resolver. The mobile terminal connects to the intranet domain access resolver using the IP address and transmits a portion of the URI. The intranet domain access resolver encodes information received from the mobile terminal and generates a new URI and returns the new URI to the mobile terminal. The mobile terminal uses the new URI to access the intranet via a gateway based on an information item obtained by decoding the original URI.

14 Claims, 7 Drawing Sheets

SYSTEM AND METHOD FOR ACCESSING INFORMATION

CROSS-REFERENCE TO RELATED APPLICATIONS

The present application claims the benefit of priority of Japanese Patent Application Serial Number 2013-007970, filed Jan. 21, 2013, with the Japanese Patent Office (JPO), the contents of which are herein incorporated by reference in their entirety.

FIELD OF THE INVENTION

The present disclosure relates to a technique for accessing, from a mobile terminal or the like, an information item or application provided on a web server.

BACKGROUND

Recently, in order to increase convenience for business, office workers tend to carry mobile terminals such as smartphones when the office workers leave the office. However, mainly because of security reasons, typically, mobile terminals are not allowed to access intranets of companies. In other words, only limited mobile applications can access resources provided in the intranets, and URIs of the resources provided in the intranets are not accessible from outside of the intranets.

For example, in a mobile terminal, a URI link for an intranet web SNS document that is embedded in an email or chat message is unusable.

Japanese Unexamined Patent Application Publication No. 2002-183596 discloses a server system for electronic commerce in a web business. In the server system, in order to quickly perform transmission or distribution of information items, an i-mode service, a www server, a private authentication server, and an authentication agent server are configured in accordance with the purpose of use. A virtual URL in which a real address is masked is issued for a highly confidential process, and a client returns an email in a predetermined time period to settle accounts.

However, the virtual URL proposed here is a URL issued by an authentication server for authentication in commerce, and is unusable for the purpose of accessing a resource provided in an intranet.

Using a conventional VPN/proxy technique for a mobile terminal in order to allow the mobile terminal to access a resource provided in an intranet is not allowable in terms of typical security policies. The reason for this is that using of the conventional VPN/proxy technique also makes it possible for other unreliable applications on the mobile terminal to access the resource provided in the intranet.

CITATION LISTING

Patent Literature 1: Japanese Unexamined Patent Application Publication No. 2002-183596.

SUMMARY

Technical Problem

An object of embodiments of the present disclosure is to provide a technique for making it possible for a mobile application that operates on a mobile terminal to access a resource which is identified by a URI provided in another application and which is provided in an intranet.

Solution to Problem

According to an aspect of the invention, a server called an intranet domain access resolver is provided, and a global DNS server is configured so as to return the IP address of the intranet domain access resolver for a specific URI of a resource provided in an intranet which is a URI included in, for example, an email accessible to a mobile terminal.

The mobile terminal accesses the global DNS server using the specific URI of the resource provided in the intranet. The global DNS server performs name resolution, and returns the IP address of the intranet domain access resolver. The mobile terminal establishes an HTTP connection to the intranet domain access resolver that is a destination for which the IP address is set, and transmits an information item equivalent to the specific URI of the resource provided in the intranet. In reality, information items concerning a scheme portion and an authority portion (a user name, a domain, and a port) included in the URI are not transmitted, and only an information item concerning a path portion that includes a path and the contents following the path (a path, a query, and a fragment) is transmitted. However, because the scheme portion and the authority portion are information items that have been provided in terms of the configuration of the intranet domain access resolver, the original URI can be restructured from the information item concerning the path portion.

The intranet domain access resolver encodes the URI of the resource provided in the intranet that is a URI which has been transmitted from the mobile terminal in this manner, and returns, together with 303 (See other), a new URI that is generated by adding the encoded URI of the resource provided in the intranet to a scheme associated with a dedicated application installed on the mobile terminal.

The mobile terminal provides, for the dedicated application (also referred to as a "client application") installed on the mobile terminal, the new URI that has been returned together with 303 (See other). Accordingly, the dedicated application performs a process illustrated in a flowchart of FIG. 6, thereby parsing the new URI, decoding and parsing the original URI included in the parsed new URI to obtain an information item, and trying to access, using the obtained information item, the resource provided in the intranet via a gateway. In this case, the gateway performs authentication using a user ID and a password for the mobile terminal.

An advantage of embodiments of the present invention is that an access from the mobile terminal to the resource provided in the intranet is achieved by appropriate redirection to the dedicated application via the intranet domain access resolver.

DETAILED DESCRIPTION

Figure 1:
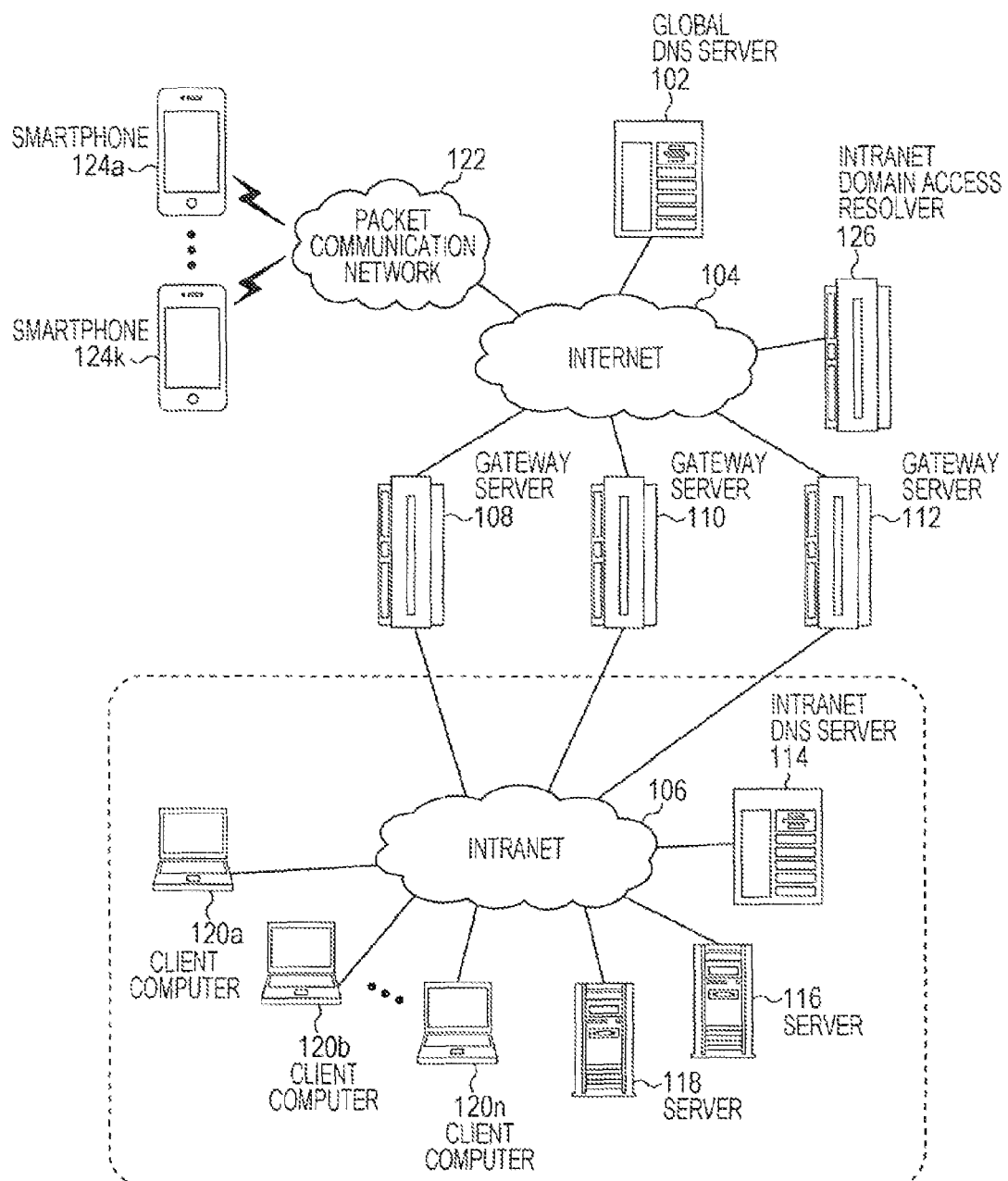
FIG. 1 is a diagram illustrating an overview of a hardware configuration for implementing an embodiment the present invention.

Hereinafter, embodiments of the present invention will be described with reference to the drawings. It is to be understood that the embodiments are provided to describe preferred embodiments of the present invention, and not intended to limit the scope of the invention to the scope provided herein. Furthermore, in the drawings given below, the same reference numerals denote the same components unless otherwise mentioned.

FIG. 1 is a diagram illustrating an overview of a hardware configuration according to an aspect of the present invention. Referring to FIG. 1, a global DNS server 102 is connected to the Internet 104, and can be accessed from various servers and other devices. The global DNS server 102 has a function of receiving a domain name included in a URI, performing name resolution, and returning an IP address corresponding to the URI.

Furthermore, gateway servers 108, 110, and 112, which may be used to enter an intranet 106, are connected to the Internet 104. The individual gateway servers 108, 110, and 112 support different protocols such as HTTP, FTP, and SMTP.

The intranet 106 is, for example, a system behind a firewall of a specific company, and an intranet DNS server 114, servers 116 and 118, client computers 120*a*, 120*b*, . . . , 120*n*, and so forth are connected to the intranet 106.

Although the configuration illustrated in FIG. 1 does not include routers or switches, it is to be understood that the routers or switches may exist in the configuration. They are omitted because the routers and switches are well-known components in the art.

Smartphones 124*a* . . . 124*k* are connected to the Internet 104 via a packet communication network 122. Consequently, the smartphones 124*a* . . . 124*k* can access various systems on the Internet 104. Note that the smartphones 124*a* . . . 124*k* may be connected to the Internet 104 via a wireless LAN base station (not illustrated) using WiFi or the like.

Furthermore, an intranet domain access resolver 126 that is a server which provides a distinctive feature for the present invention is connected to the Internet 104.

The global DNS server 102 is configured so as to return the IP address of the intranet domain access resolver 126 for a query about a specific URI of a resource provided in the intranet 106.

The intranet domain access resolver 126 has a URI mapping pattern 308 (FIG. 3) that is used to encode a URI. The intranet domain access resolver 126 has a function of, when the intranet domain access resolver 126 is accessed with GET path using a path portion that is a specific URI of a resource provided in the intranet 106, performing matching between the path portion and the URI mapping pattern 308, adding a URI information item concerning the URI that has been reconfigured and encoded to a scheme associated with the URI mapping pattern 308 (associated with a specific mobile application), and returning a return code called 303 (See other).

Dedicated applications 124*a*-1 . . . 124*k*-1 (described below), each of which has a function of decoding a URI transmitted from the intranet domain access resolver 126 in response to 303 (See other) transmitted from the intranet domain access resolver 126, are installed in the smartphones 124*a* . . . 124*k*, respectively.

Figure 2:
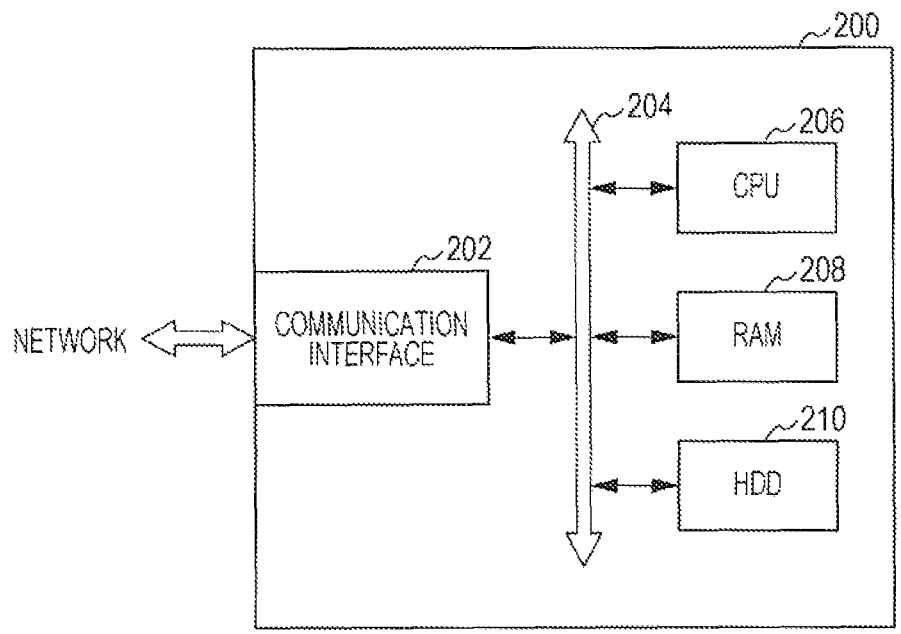
FIG. 2 is a block diagram of an internal configuration of a server in the hardware configuration of FIG. 1.

FIG. 2 illustrates a configuration common to the global DNS server 102, the gateway servers 108, 110, and 112, the intranet DNS server 114, the servers 116 and 118, and the intranet domain access resolver 126. Here, they are simply and collectively referred to as "servers 200".

A communication interface 202 of each of the servers 200 is connected to a network. The communication interface 202 is further connected to a bus 204. A CPU 206, a main storage (RAM) 208, and a hard disk drive (HDD) 210 are connected to the bus 204.

Furthermore, a keyboard, a mouse, and a display are connected to the server 200 although they are not illustrated. Using them, a maintenance person may perform management or a maintenance task for the entire server 200.

An operating system is stored in the hard disk drive 210 of the server 200. Preferably, Java® EE that realizes a Java® virtual environment is installed in the hard disk drive 210.

Preferably, IBM® WebSphere™ Application Server (WAS) is installed in the hard disk drive 210 of the server 200.

Note that various types of servers, such as IBM® System X, System i, and System p, that can be bought from International Business Machines Corporation can be used as the above-described servers 200, but the servers 200 are not limited thereto. In this case, examples of a usable operating system include AIX™, UNIX™, Linux™, and Windows™ 2003 Server.

Figure 3:
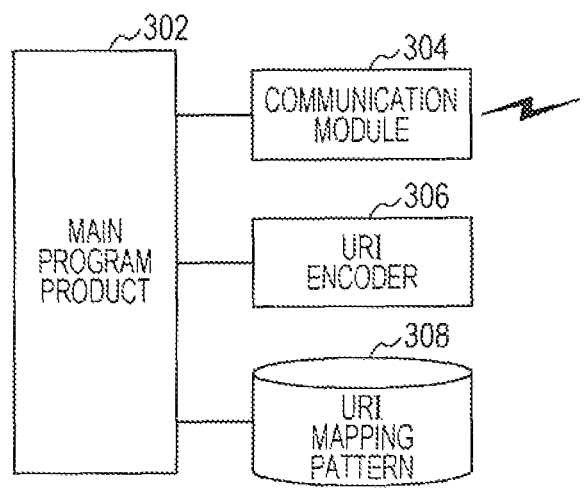
FIG. 3 is a diagram illustrating a functional configuration of an intranet domain access resolver.

FIG. 3 is a diagram illustrating a functional block of functions of the intranet domain access resolver 126 that are functions related to the present invention. Referring to FIG. 3, a main program product 302 has a function of controlling an entire operation.

A communication module 304 has a function of receiving, from a server or another apparatus that is connected to the Internet 104, data that has been transmitted using the IP address which is set for the intranet domain access resolver 126, or returning a response to a server or apparatus that has transmitted data. In this embodiment, the smartphones 124*a* . . . 124*k* access the communication module 304 via the packet communication network 122 and the Internet 104.

A URI encoder 306 has a function of selecting, for a URI received by the communication module 304, a scheme on the basis of information items of the URI mapping pattern 308, and providing a converted URI.

The information items of the URI mapping pattern 308 can be set in advance, and are used to parse a URI and convert the URI into a mobile application scheme. Thus, when the mobile application scheme is applnconns, the URI mapping pattern 308 includes {https,".*"}=>applnconns or an information item similar to {http,".*"}=>applnconns. Lotus® Connections, provided from International Business Machines Corporation, is an exemplary mobile application associated with the mobile application scheme.

When the URI encoder 306 encodes a predetermined URI and outputs the encoded URI, the main program product 302 returns the encoded URI together with 303 (See other) via the communication module 304 to a server or apparatus that has transmitted the URI.

Figure 4:
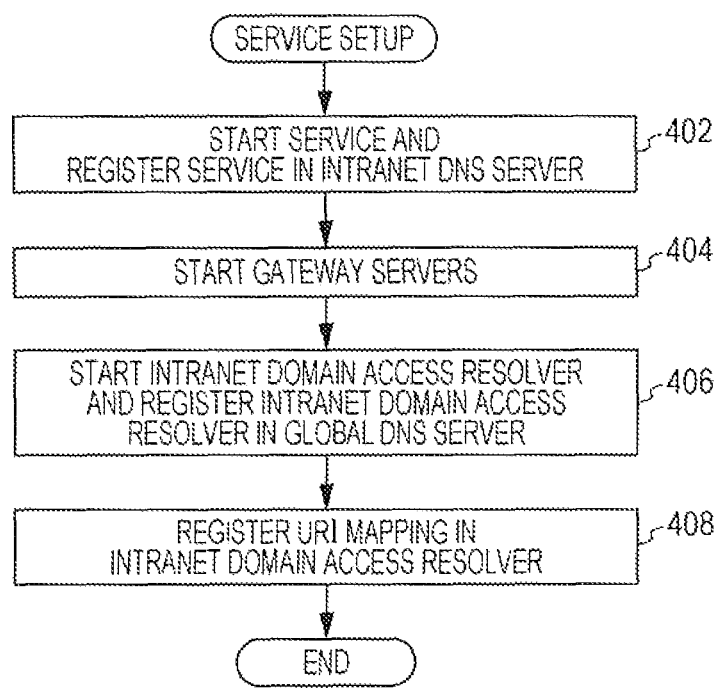
FIG. 4 is a diagram illustrating a flowchart of a service setup process.

Next, processes in the present invention will be described with reference to flowcharts of FIG. 4 and FIGS. 4-6. FIG. 4 is a diagram illustrating a service setup process. Regarding the process illustrated in FIG. 4, preferably, an operator operates a client computer provided in the intranet 106, whereby a setup program product is executed.

In step 402, the setup program product starts a service that is to be accessed by the smartphone 124a and that is provided within the intranet 106, and registers the service in the intranet DNS server 114.

In step 404, the setup program product starts the gateway servers 108, 110, and 112.

In step 406, the setup program product starts the intranet domain access resolver 126, and registers the intranet domain access resolver 126 in the global DNS server 102. Accordingly, the global DNS server 102 returns the IP address of the intranet domain access resolver 126 in response to a predetermined URI of a resource provided in the intranet 106.

In step 408, the setup program product registers a URI mapping in the intranet domain access resolver 126.

Next, a process of starting or restarting a dedicated application in the smartphone 124a will be described with reference to the flowchart of FIG. 5.

Figure 5:
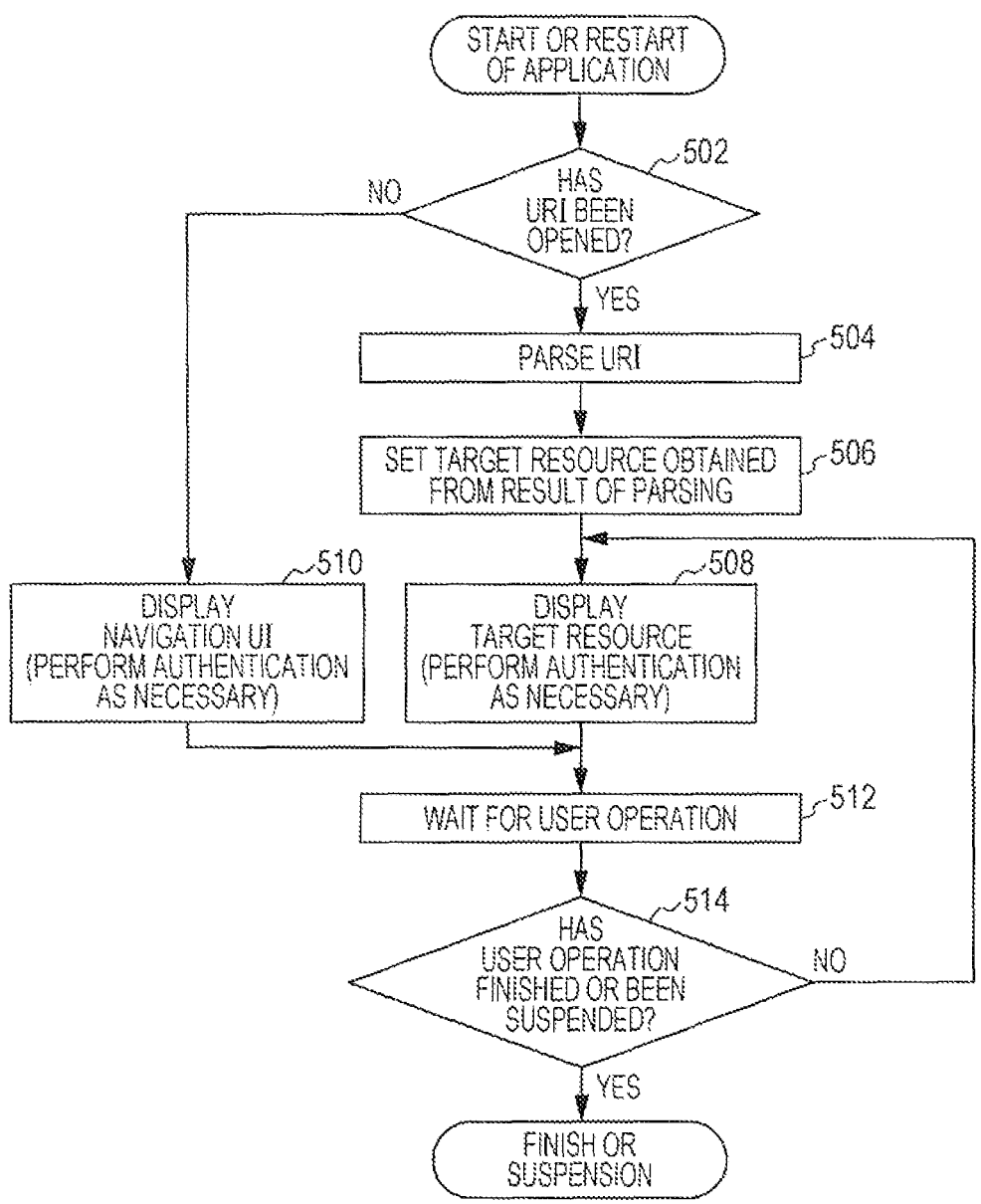
FIG. 5 is a diagram illustrating a flowchart of a process for starting or restarting a dedicated application.

In step 502, illustrated in FIG. 5, the smartphone 124a determines whether a URI has been opened, i.e., whether a user of the smartphone 124a has selected a URI written in an email by clicking.

In step 502, when the user has selected the URI written in the email by clicking, the smartphone 124a preferably starts a browser, such as Safari™, and transmits a domain name included in the URI to the global DNS server 102. When the URI written in the email is not a URI of a resource provided in the intranet 106 but is a typical URI, the global DNS server 102 returns the IP address of a web server corresponding to the URI. Thus, the browser of the smartphone 124a displays a site located at the IP address.

When the URI written in the email is a predetermined URI of a resource provided in the intranet 106, the global DNS server 102 returns the IP address of the intranet domain access resolver 126. Thus, the smartphone 124a establishes, using the IP address, an HTTP connection to the intranet domain access resolver 126, and tries GET path using a path portion that is obtained by excluding, from the URI, the scheme portion and the authority portion including a domain name, and so forth.

Then, the intranet domain access resolver 126 encodes the URI, and sets a result of the encoding as a target resource for a specific scheme to obtain a new URI. The intranet domain access resolver 126 returns the new URI together with a return code called 303 (See other) to the smartphone 124a.

The smartphone 124a provides the encoded original URI for the dedicated application 124a-1 in response to 303 (See other) and the scheme of the new URI, and activates the dedicated application 124a-1. In step 504, the dedicated application 124a-1 parses (decodes) the provided target resource, and, in step 506, sets the target resource on the basis of a result of parsing. The dedicated application 124a-1 enters the intranet 106 via the gateway servers 108, 110, and 112, and queries the intranet domain access resolver 126. The dedicated application 124a-1 reaches the target resource, and, in step 508, displays the target resource. Note that, typically, the dedicated application 124a-1 performs, for the gateway servers 108, 110, and 112, authentication using a user ID and a password. After that, in step 512, the dedicated application 124a-1 waits for a user operation. In step 514, when it is determined that the user operation has not finished or been suspended, in step 508, the dedicated application 124a-1 displays the target resource.

When the URI has not been opened in step 502, in step 510, as necessary, the dedicated application 124a-1 performs authentication using a user ID and a password, and displays a navigation UI. In step 512, the dedicated application 124a-1 waits for a user operation. In step 514, when it is determined that the user operation has not finished or been suspended, in step 508, the dedicated application 124a-1 displays the target resource. Also in this case, typically, the dedicated application 124a-1 performs authentication using a user ID and a password.

In step 514, when it is determined that the user operation has finished or been suspended, the process finishes or is terminated.

Next, step 504 in which the dedicated application 124a-1 of the smartphone 124a parses a URI will be described with reference to the flowchart of FIG. 6. Here, it is assumed that applnconns:https%3A%2F%2Fw3-connections.company.com%2FcommunityView%3F%0B communityUuid%3D9f0b495%26file %3Da1988063 is passed from the smartphone 124a on to the dedicated application 124a-1. A scheme applnconns is a prefix for a dedicated application. Various prefixes are used in accordance with specific embodiments.

Figure 6:
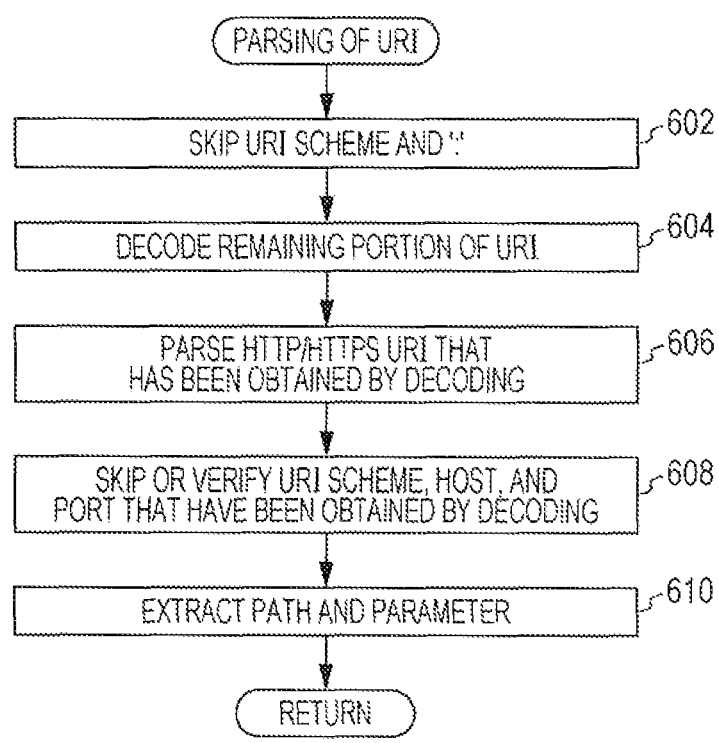
FIG. 6 is a diagram illustrating a flowchart of a process of parsing a URI, which is performed in the dedicated application.

In step 602 illustrated in FIG. 6, a URI parser of the dedicated application 124a-1 skips a URI scheme, i.e., applnconns, and ':'. In other words, the URI parser skips applnconns: included in applnconns:https%3A%2F%2Fw3-connections.company.com%2FcommunityView%3F%0B communityUuid%3D9f0b495%26file %3Da1988063.

In step 604, the URI parser of the dedicated application 124a-1 decodes the remaining portion of the URI. A result of decoding is https://w3-connections.company.com/communityView?communityUuid=9f0b495&file=a1988063.

In step 606, the URI parser of the dedicated application 124a-1 parses an HTTP/HTTPS URI that is a result of decoding, i.e., https://w3-connections.company.com/communityView?communityUuid=9f0b495&file=a1988063.

In step 608, the URI parser of the dedicated application 124a-1 skips or verifies a URI scheme, a host, and a port, which are results of decoding. In other words, the URI parser skips https://w3-connections.company.com included in https://w3-connections.company.com/communityView?communityUuid=9f0b495&file=a1988063, or verifies whether https://w3-connections.company.com represents a URI scheme, a host, and a port.

In step 610, the URI parser of the dedicated application 124a-1 extracts a path and a parameter, i.e., communityUuid=9f0b495 and file=a1988063.

Next, specific processes in the present invention will be schematically described with reference to FIGS. 7 and 8.

Figure 7:
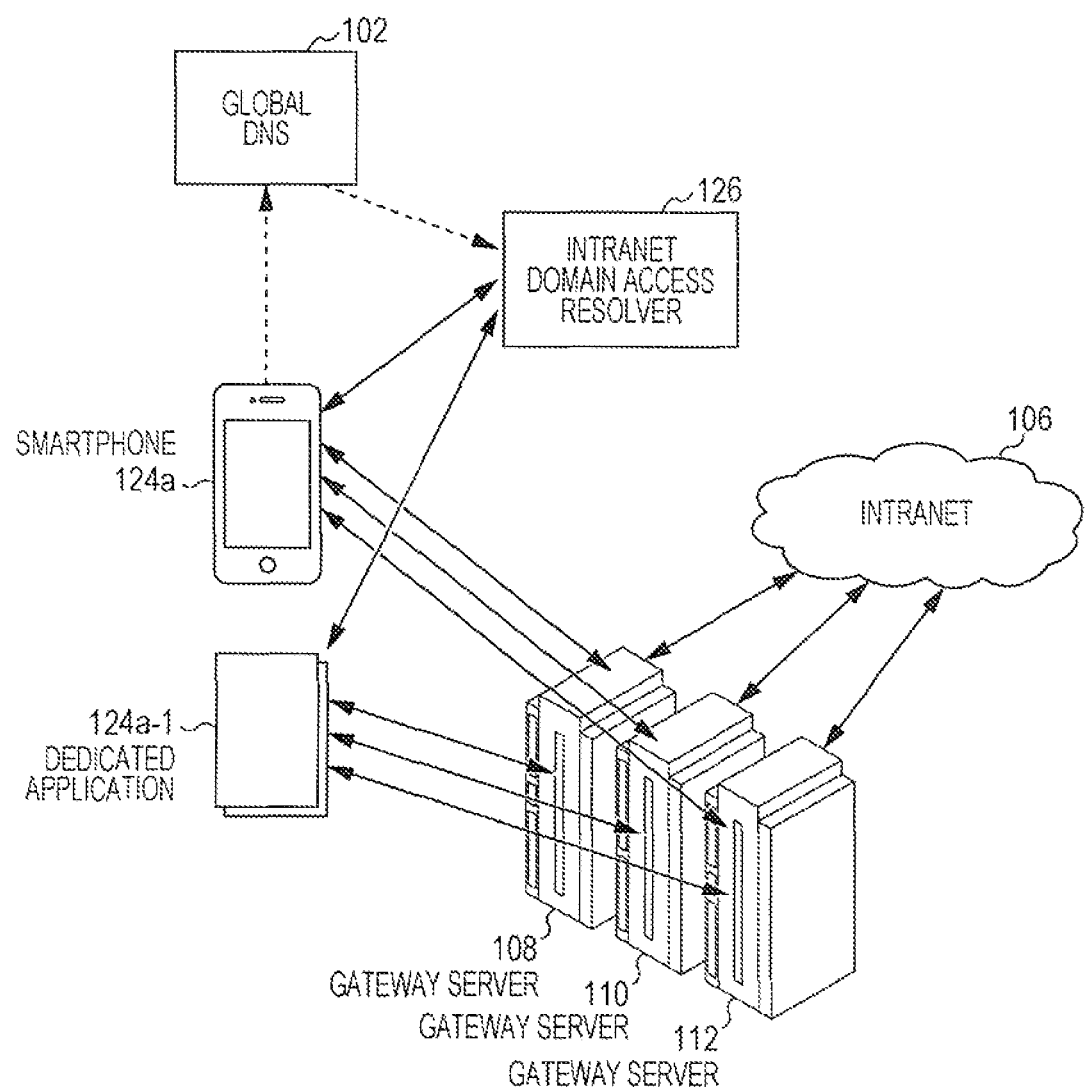
FIG. 7 is a diagram illustrating an overview of the processes according to an embodiment of the present invention.

In FIG. 7, when the user of the smartphone 124a selects, by clicking, the URI https://w3-connections.company.com/communityView?communityUuid=9f0b495&file=a1988063, which is a URI of a resource provided in the intranet 106 which is a URI included in an email, the smartphone 124a queries the global DNS server 102 about an IP address corresponding to this URI. Typically, because the global DNS server 102 is not able to perform name resolution for the URI of the resource provided in the intranet 106, the global DNS server 102 only returns 404 (Not found) or guides the smartphone 124a to a sorry server. However, according to an aspect of the present invention, the global DNS server 102 is set so as to return the IP address of the intranet domain access resolver 126 for the URI of the resource provided in the intranet 106. Thus, the smartphone 124a submits a request to the intranet domain access resolver 126, using the returned IP address, GET/communityView?communityUuid=9f0b495&file=a1988063 HTTP/1.1.

Then, the intranet domain access resolver 126 performs encoding on the basis of https://w3-connections.company.com/communityView?communityUuid=9f0b495&file=a1988063 with reference to the URI mapping pattern 308, thereby generating applnconns:https%3A%2F%2Fw3-connections.company.com%2FcommunityView%3F%0BcommunityUuid%3D9f0b495%26file %3Da1988063 that is a new URI. The intranet domain access resolver 126 returns the new URI together with an HTTP response called 303 (See other) to the smartphone 124*a*.

Figure 8:
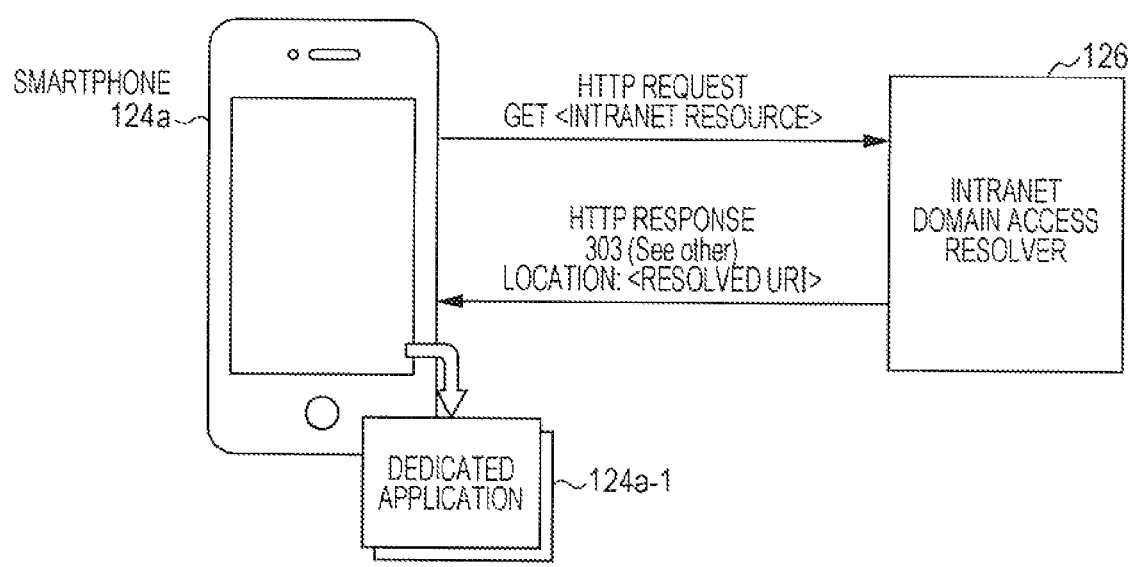
FIG. 8 is a diagram illustrating a session between a smartphone and an intranet domain access resolver.

Then, as illustrated in FIG. 8, the smartphone 124*a* checks applnconns: that is the head of applnconns:https%3A%2F%2Fw3-connections.company.com%2FcommunityView%3F%0BcommunityUuid%3D9f0b495%26file %3Da1988063 which is the returned URI by which a transfer destination is identified, and passes the URI on to the dedicated application 124*a*-1.

The dedicated application 124*a*-1 divides applnconns:https%3A%2F%2Fw3-connections.company.com%2FcommunityView%3F%0BcommunityUuid%3D9f0b495%26file %3Da1988063 (skips applnconns: that is the head thereof), and decodes https%3A%2F%2Fw3-connections.company.com%2FcommunityView%3F%0BcommunityUuid%3D9f0b495%26file %3Da1988063, thereby obtaining https://w3-connections.company.com/communityView?communityUuid=9f0b495&file=a1988063. The dedicated application 124*a*-1 parses https://w3-connections.company.com/communityView?communityUuid=9f0b495&file=a1988063 that has been obtained, thereby obtaining communityUuid=9f0b495 and file=a1988063 that are parameter information items. The dedicated application 124*a*-1 accesses, using communityUuid=9f0b495 and file=a1988063 that are obtained parameter information items, the gateway servers 108, 110, and 112. In this case, each of the gateway servers 108, 110, and 112 requests, of the dedicated application 124*a*-1, a user ID and a password, and authenticates the dedicated application 124*a*-1 using the user ID and the password. In this case, once the dedicated application 124*a*-1 is authenticated, a result indicating that the dedicated application 124*a*-1 has been authenticated may be held on the dedicated application 124*a*-1 side, and may be reused within a certain time period.

In this manner, when the dedicated application 124*a*-1 of the smartphone 124*a* is authenticated, the dedicated application 124*a*-1 may enter the intranet 106 via a gateway server. How to access a gateway server or how to access a resource provided in the intranet 106 from the gateway server in accordance with the access to the gateway server can be variously changed in accordance with the configuration of the gateway server. For example, in the case of accessing a resource provided in the intranet 106 using an HTTP protocol for a client, which may be a protocol used in an intranet web browser or the like, when the dedicated application 124*a*-1 enters the intranet 106, the dedicated application 124*a*-1 queries the intranet DNS server 114, and the intranet DNS server performs name resolution. The dedicated application 124*a*-1 establishes an HTTP connection to https://w3-connections.company.com/communityView?communityUuid=9f0b495&file=a1988063 that is the URI of the resource provided in the intranet 106, thereby accessing the target resource provided in the intranet 106.

The present invention is described above as an embodiment using specific hardware and software such as Java®. However, the present invention is not limited to specific hardware and software and a specific platform, and it is to be understood that the present invention may be applied to any platform.

Furthermore, the apparatus that tries to access a URI of a resource provided in an intranet is not limited to a smartphone, and may be a more typical mobile terminal or an apparatus such as a typical mobile PC.

REFERENCE NUMERALS

Reference Numerals: 102—global DNS server; 104: Internet; 106: intranet; 108: gateway server; 110: gateway server; 112: gateway server; 114: intranet DNS server; 120*a* . . . 124*n*: client computers; 124*a* . . . 124*k*: smartphones; 124*a*-1 . . . 124*k*-1: dedicated applications of smartphones; 126: intranet domain access resolver.

What is claimed is:

1. A computer system for accessing information, the computer system comprising:

one or more computer processors;

one or more non-transitory computer-readable storage media;

an intranet system having a resource associated with a URI, the URI including a specific intranet domain and being accessible using a predetermined protocol supported by a server;

a gateway server provided at a boundary between an outside and an inside of the intranet system, the gateway server being capable of accessing the resource using information included in the URI including the specific intranet domain, the resource being associated with the URI including the intranet domain and being provided in the intranet system;

a client application provided on a terminal apparatus provided outside the intranet system, the client application being activated in association with a specific URI scheme, decoding information that is provided in a URI used in the activation and that indicates the URI, communicating with the gateway server, and accessing the resource;

an intranet domain access resolver adding, in response to being accessed using the information included in the URI including the intranet domain from the terminal apparatus, a URI obtained by encoding the URI including the intranet domain to the URI scheme, the URI scheme being associated with the client application so that the client application is activated, to generate a URI, and returning the generated URI, wherein, in a case where the URI including the intranet domain is accessed from another one of applications that are provided on the terminal apparatus and that include a web browser, on the basis of the URI returned from the intranet domain access resolver, the client application is activated, and the resource is accessible via the gateway server;

program instructions stored on the computer-readable storage media for execution by at least one of the one or more processors, the program instructions comprising:
program instructions to parse the URI, in response to determining that the URI has been opened, wherein the program instructions to parse the URI further comprise:
program instructions to skip the URI scheme and ":" for the encoded URI included in the returned URI;
program instructions to decode the remaining portion of the returned URI;
program instructions to parse the decoded URI;
program instructions to verify the decoded remaining portions of the returned URI; and
program instructions to extract a path and a parameter;
program instructions to designate a target resource for display;
program instructions to display the target resource;
program instructions to monitor a user operation; and
program instructions to determine a terminated state based on determining that the user operation has either finished or terminated.

2. The system according to claim 1, wherein the predetermined protocol is HTTP or HTTPS protocol.

3. The system according to claim 2, further comprising a global DNS server returning an IP address of the intranet domain access resolver in response to a query about the URI including the intranet domain.

4. The system according to claim 2, wherein the intranet domain access resolver returns the generated URI together with an HTTP 303 response.

5. The system according to claim 1, wherein the terminal apparatus is a smartphone.

6. The system according to claim 1, wherein the client application includes: requesting, by the processor, of a user of the terminal apparatus, authentication information requested by the gateway server; and
temporarily storing, by the processor, the obtained authentication information in memory, and
wherein, in a case of accessing the resource via the client application after the authentication information has been stored, authentication information is not requested of the user.

7. A method implemented by a processor of a computer in a system including:
an intranet system having a resource associated with a URI, the URI including a specific intranet domain and being accessible using a predetermined protocol supported by a server;
a gateway server provided at a boundary between an outside and an inside of the intranet system, the gateway server being capable of accessing the resource using information included in the URI including the intranet domain, the resource being associated with the URI including the intranet domain and being provided in the intranet system;
a client application provided on a terminal apparatus provided outside the intranet system, the client application being activated in association with a specific URI scheme, decoding information that is provided in a URI used in the activation and that indicates the URI, communicating with the gateway server, and accessing the resource; and
an intranet domain access resolver,
wherein the method comprises:
with the intranet domain access resolver, in response to being accessed using the information included in the URI including the intranet domain from the terminal apparatus, adding a URI obtained by encoding the URI including the intranet domain to the URI scheme, the URI scheme being associated with the client application so that the client application is activated, to generate a URI, and returning the generated URI;
with the terminal apparatus, in a case where the terminal apparatus accesses the URI including the intranet domain, on the basis of the URI returned from the intranet domain access resolver, activating the client application and accessing the resource via the gateway server;
parsing the URI, in response to determining that the URI has been opened, wherein parsing the URI further comprises:
skipping the URI scheme and ":" for the encoded URI included in the returned URI;
decoding the remaining portion of the returned URI;
parsing the decoded URI;
verifying the decoded remaining portions of the returned URI; and
extracting a path and a parameter;
designating a target resource for display;
displaying the target resource;
monitoring a user operation; and
determining a terminated state based on determining that the user operation has either finished or terminated.

8. The method according to claim 7, wherein the predetermined protocol is HTTP or HTTPS protocol.

9. The method according to claim 8, wherein the system further includes a global DNS server, and the method further comprises a step of, with the global DNS server, returning an IP address of the intranet domain access resolver in response to a query about the URI including the intranet domain.

10. The method according to claim 8, wherein, together with an HTTP 303 response, the generated URI is returned by the intranet domain access resolver.

11. The method according to claim 7, wherein the terminal apparatus is a smartphone.

12. The method according to claim 7, wherein the client application executes:
requesting, by the processor, of a user of the terminal apparatus, authentication information requested by the gateway server; and
temporarily storing, by the processor, the obtained authentication information in memory, and
wherein, in a case of accessing the resource via the client application after the authentication information has been stored, authentication information is not requested of the user.

13. The system according to claim 1, wherein the remaining portion of the returned URI include at least one or more of: a URI scheme, a host, and a port.

14. The method according to claim 7, wherein the remaining portion of the returned URI include at least one or more of: a URI scheme, a host, and a port.

* * * * *